United States Patent [19]

Thayer

[11] Patent Number: 5,706,650
[45] Date of Patent: Jan. 13, 1998

[54] VECTORING NOZZLE USING INJECTED HIGH PRESSURE AIR

[75] Inventor: Edward B. Thayer, Palm Beach Gardens, Fla.

[73] Assignee: United Technologies Corporation, Hartford, Conn.

[21] Appl. No.: 513,100

[22] Filed: Aug. 9, 1995

[51] Int. Cl.[6] ............................................. F02K 1/28
[52] U.S. Cl. ........................ 60/231; 60/230; 60/271; 239/265.17
[58] Field of Search .................... 60/228, 229, 230, 60/231, 270.1, 271; 239/265.17, 265.19; 244/12.5, 23 D

[56] References Cited

U.S. PATENT DOCUMENTS

| | | | |
|---|---|---|---|
| 2,805,831 | 9/1957 | Von Zborowski | 60/270.1 |
| 2,900,789 | 8/1959 | Philpot | 60/270.1 |
| 2,943,821 | 7/1960 | Wetherbee, Jr. | 60/231 |
| 3,016,699 | 1/1962 | Bertin et al. | 239/265.17 |
| 3,024,602 | 3/1962 | Bertin et al. | 60/231 |
| 3,054,256 | 9/1962 | Minos | 239/265.17 |
| 3,280,564 | 10/1966 | Keenan et al. | 60/270.1 |
| 3,426,972 | 2/1969 | Osburn | 239/8 |
| 3,467,312 | 9/1969 | Mehr | 239/265.19 |
| 3,641,766 | 2/1972 | Uehling | 239/265.17 |
| 3,819,117 | 6/1974 | Moorhead, Jr. | 239/265.23 |
| 3,837,411 | 9/1974 | Nash et al. | 60/229 |
| 4,002,024 | 1/1977 | Nye et al. | 60/271 |
| 4,819,876 | 4/1989 | Thayer | 239/265.39 |
| 4,836,451 | 6/1989 | Herrick et al. | 239/265.27 |
| 4,848,664 | 7/1989 | Thayer | 239/265.29 |
| 5,343,695 | 9/1994 | Pascal et al. | 60/270.1 |
| 5,435,489 | 7/1995 | Jenkins et al. | 60/231 |
| 5,485,959 | 1/1996 | Wood et al. | 60/228 |

FOREIGN PATENT DOCUMENTS

| | | | |
|---|---|---|---|
| 537785 | 5/1955 | Belgium | 60/231 |
| 1515198 | 1/1967 | France | 60/231 |
| 1481661 | 5/1969 | Germany | 60/231 |

*Primary Examiner*—Timothy Thorpe
*Assistant Examiner*—Ted Kim

[57] ABSTRACT

An exhaust nozzle for a gas turbine engine where pitch and yaw vectoring is achieved using fluidics by injecting high pressure air into the exhaust stream. The injected high pressure air deflects the exhaust stream, vectoring the aircraft accordingly. The injected high pressure air for vectoring is selectively injected. A pivoting manifold 44 allows for injection of either ram air (52) or vectoring high pressure air (56) into the exhaust flow.

24 Claims, 4 Drawing Sheets

5,706,650

VECTORING NOZZLE USING INJECTED HIGH PRESSURE AIR

TECHNICAL FIELD

This invention relates to gas turbine engine exhaust nozzles, and more particularly, to vectoring exhaust nozzles.

BACKGROUND OF THE INVENTION

Thrust vectoring exhaust nozzles for use in high performance gas turbine engine powered aircraft is well known. The typical thrust vectoring nozzle has a two dimensional convergent-divergent flap arrangement with a rectangular flow passage defined by two parallel and spaced apart sidewalls and two convergent-divergent flap assemblies. The convergent flap is pivotable into the exhaust nozzle throat. The divergent flap is hinged at the divergent flap leading edge and the trailing edge of the corresponding convergent flap. The divergent flap is pivotable for defining the vertical discharge vectored expansion rate of the exhaust gas stream. See U.S. Pat. No. 4,819,876.

Two dimensional nozzles provide single geometric plane thrust vectoring in the vertical or pitch direction.

Multiplane exhaust nozzles are capable of both pitch and yaw vectoring. The prior art multiplane thrust vectoring nozzle designs require a trade off of increased weight and design complexity for the multiplane vectoring capability. The multiplane exhaust nozzle, however, is particularly advantageous for short take-off and landing applications and a highly efficient form of aircraft control at high altitudes where typical aircraft directional controls are inefficient or ineffective.

As with any aircraft application, reliability and weight are critical factors; therefore, simple and light weight designs are favored over complex and heavier designs. There is need for a multiplane thrust vectoring exhaust nozzle with a simple design, minimizing the number of components and overall weight of the nozzle.

DISCLOSURE OF THE INVENTION

It is, therefore, an object of the present invention to provide a multiplane exhaust nozzle for a gas turbine engine to provide pitch and yaw vectoring capability.

It is also an object of the present invention to provide a multiplane exhaust nozzle wherein the exhaust stream vectoring capability is accomplished by using high pressure air injected into the engine exhaust stream, the injected air being non parallel to the engine major axis.

It is also an object of the present invention to provide a multiplane exhaust nozzle wherein the fluidic vectoring is accomplished by components internal of the engine and the exhaust nozzle.

It is also an object of the present invention to provide a method for vectoring the exhaust stream of a gas turbine engine using high pressure air to deflect the exhaust stream, or fluidics.

According to the present invention, an exhaust nozzle in cooperation with a gas turbine engine that has ram air and high pressure fan air fed to the exhaust nozzle, includes a plurality of convergent and divergent flaps and fixed divergent cowling walls. Each of the divergent flaps is pivotally connected to the corresponding convergent flap. The flaps and cowling walls define a plurality of flow surfaces. The flow surfaces define an engine exhaust stream passageway which may be of any polygonal shape. Fan air, ram air, and core air enter the engine. The ram air exits downstream of the divergent flaps through ram air ducts. When the nozzle is in non-vectored operation, core gases exit the exhaust nozzle parallel with a major axis of the engine and ram air flows adjacent to the flow surfaces, external of the core airstream.

When the nozzle is in the vectored operation, a fan air manifold injects high pressure fan air into the exhaust core airstream, the injected air velocity vector being non parallel to the velocity vector of the exhaust stream. The exhaust core airstream is deflected to the flow surface or flow surfaces opposite of where the high pressure fan air is injected, vectoring the aircraft accordingly. Pitch and yaw vectoring, or a combination thereof may be achieved.

When the engine is in afterburner operation, the high pressure fan air may be delivered through the fixed cowling flow surface to provide cooling air between the cowling flow surface and the exhaust airstream.

The exhaust nozzle may be integrated with the aircraft external surface for a smooth transition between the aircraft outer skin and the exhaust nozzle.

The foregoing and other advantages of the present invention will become more apparent from the following description and accompanying drawings.

BEST MODE FOR CARRYING OUT THE INVENTION

Figure 1:
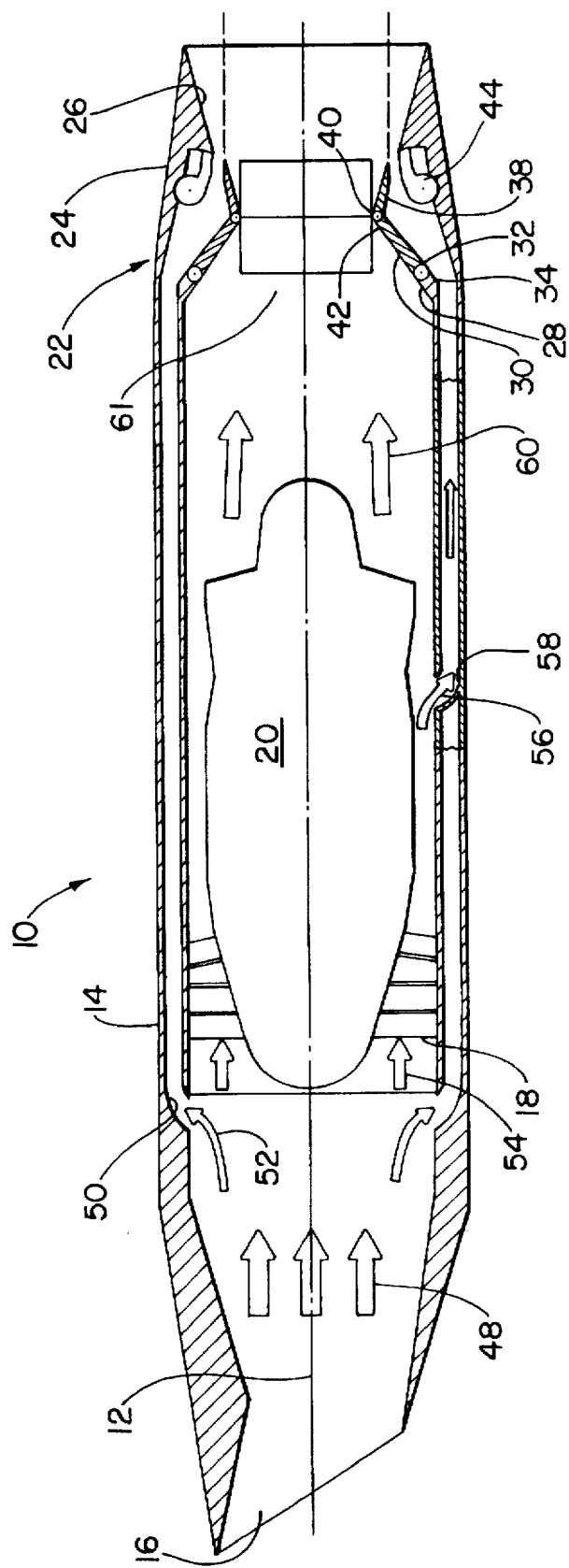
FIG. 1 is a cross sectional view a gas turbine engine with an exhaust nozzle of the present invention.

According to the present invention, a gas turbine engine 10 has a major axis 12, an outer casing 14 and an inlet 16, as shown in FIG. 1. Downstream of the inlet 16 and contained in the outer casing 14 is a fan 18 and an engine core 20. Downstream of the engine core 20 and adjacent to the outer casing 14 is an exhaust nozzle 22. The exhaust nozzle 22 comprises a fixed cowling 24 with internal divergent walls 26, a plurality of first convergent flaps 28, and a plurality of second convergent flaps 30. The second convergent flaps 30 are downstream of the first convergent flaps 28. Each second convergent flap 30 is pivotally connected at a corresponding second convergent flap leading edge 32 to a first convergent flap trailing edge 34 by a flap hinge. A plurality of divergent flaps 38 are each pivotally connected at a divergent flap leading edge 40 to a corresponding second convergent flap trailing edge 42 by a flap hinge. The divergent flaps 38 are downstream of the second convergent flaps 30. The exhaust nozzle 22 also has means for injecting high pressure air into the exhaust stream through a plurality of pivotable fan air manifolds 44 upstream of the fixed cowling 24 and downstream of the divergent flaps 38.

Figure 2:
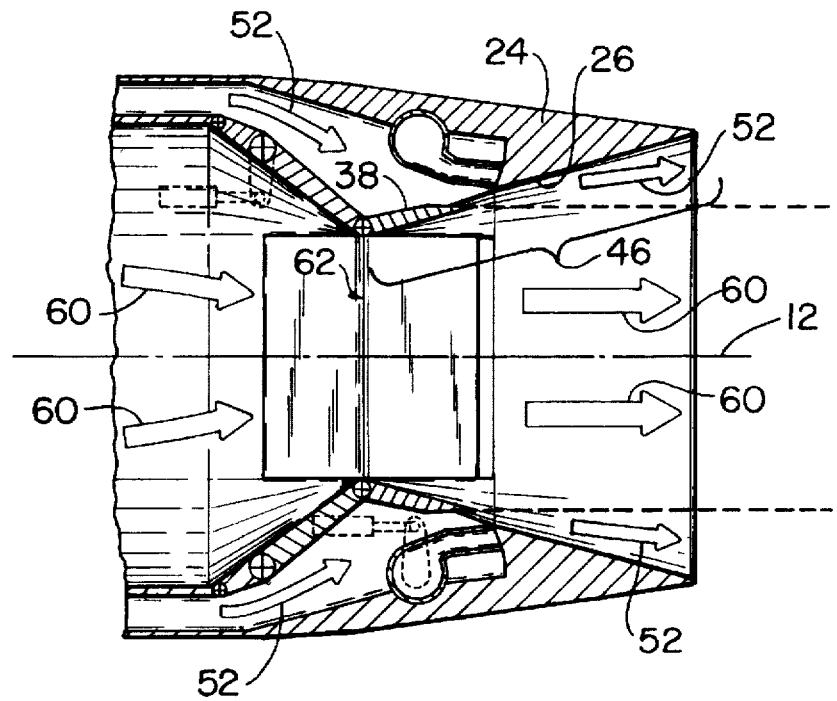
FIG. 2 is a cross sectional view of the exhaust nozzle of the present invention in non-vectoring operation.

As shown in FIG. 2, in this preferred embodiment there are four sets of convergent flaps, divergent flap, and pivotable fan air manifolds that work in cooperation with a generally rectangular fixed cowling. The invention, however, is not limited to a rectangular configuration, any polygonal exhaust stream passageway configuration could be used. Each set of divergent flaps 38 in cooperation with a cowling divergent wall 26 defines a flow surface 46.

Referring back to FIG. 1, inlet air 48 enters the inlet 16 and is bifurcated before it enters the fan 18. A portion of the inlet air 48 enters a ram air duct 50. This portion of air will be referred to as ram air 52. Ram air 52 bypasses the engine core and derives its energy solely from the forward motion of the aircraft. The exhaust nozzle has means for injecting ram air into the exhaust stream passageway via the ram air duct 50, which extends the length of the engine 10 and terminates upstream of the cowling internal divergent walls 26 and the fan air manifolds 44.

Another portion of the inlet air 48 enters the fan 18. This portion of air will be referred to as fan air 54. The fan air 54 is pressurized in the fan 18 becoming high pressure fan air 56. A portion of the fan air 56 exits the fan 18 through a plurality of high pressure fan air ducts 58.

Another portion of the high pressure fan air 56 travels through diffuser, combustor, and turbine areas (not shown) and will be referred to as core air 60. The high pressure fan air ducts 58 terminate at the pivotable fan air manifold 44, where the high pressure fan air 56 is available for injection into the exhaust stream.

As shown in FIG. 1, at cruise power, core air 60 exits the engine core 20 and converges at an exhaust stream passageway 61 as the core air 60 flows adjacent and past the first and second convergent flaps 28 and 30. As shown in FIG. 2, the core air 60 then reaches a throat area 62, where the exhaust nozzle and exhaust stream passageway 61 is at maximum convergence, and the core air 60 is at maximum pressure and velocity. The core air 60 then expands as it flows adjacent and past the divergent flaps 38 and the fixed cowling divergent walls 26. The convergent and divergent flaps are arranged to influence the core air 60 while segregating the ram air 52 from the core air 60 as the air flows through the exhaust stream passageway 61.

The fan air manifolds 44 are in the off position when the nozzle is not vectoring, blocking the flow of high pressure fan air 56 from the exhaust airstream. The divergent flaps 38 allow a portion of the ram air 52 to exit downstream of the divergent flaps 38, adjacent to the fixed cowling 24, and into the exhaust airstream. Therefore, the engine exhaust, while not vectoring, comprises core air 60 at the center of the exhaust stream and ram air 52 adjacent to the cowling divergent walls 26. The high pressure fan air 56 is static in the high pressure fan air ducts 58 and the pivotable fan air manifolds 44 while in non-vectoring operation.

Figure 3:
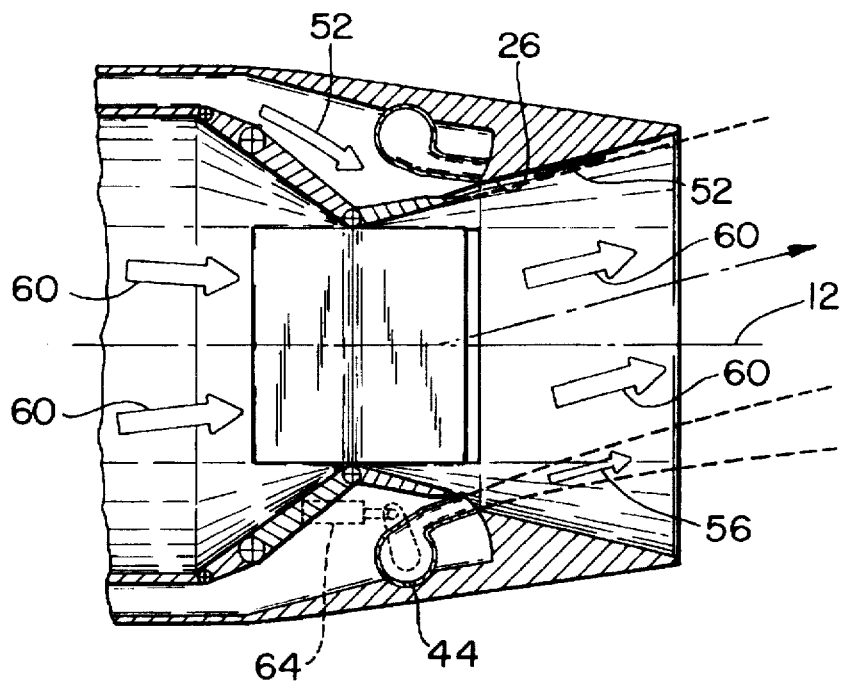
FIG. 3 is a cross sectional view of the exhaust nozzle of the present invention in vectoring operation.

As shown in FIG. 3, when the exhaust is vectored, an actuation system 64 pivots the fan air manifold 44 so that the ram air flow is blocked off and high pressure fan air 56 is injected from the fan air manifold 44 into the exhaust stream. The injected high pressure fan air 56 is of higher static pressure than the ram air 52 and the core air 60. The core air 60 is of higher pressure than the ram air 52; therefore, the injected high pressure fan air 56 deflects the core air 60 away from the engine major axis 12 and towards the opposing divergent flap 38 and cowling divergent wall 26, or the flow surface 46. The amount of deflection of the core air may be controlled by the amount of fan air that is introduced into the core airstream via the pivotable fan air manifold 44. A thin layer of ram air 52 provides a thermal barrier between the vectored core air 60 and the cowling divergent wall 26.

The present invention allows the core air 60 to be vectored away from the engine major axis 12 using the high pressure fan air 56, otherwise known as fluidics. Fluidics, when used in this context, is referring to a device that depends for operation on the pressures and flows of a fluid in a shaped passageway. The present invention uses approximately five percent of fan air to deflect the core air approximately eight degrees from the major axis 12.

The exhaust nozzle of the present invention allows vectoring with fluidics without utilizing external moveable parts, which on some advanced fighter aircraft is a desired feature. In the present disclosure, the high pressure fan air 56, or deflecting air, is not susceptible to thermal damage as are other types of vectoring systems.

Figure 6:
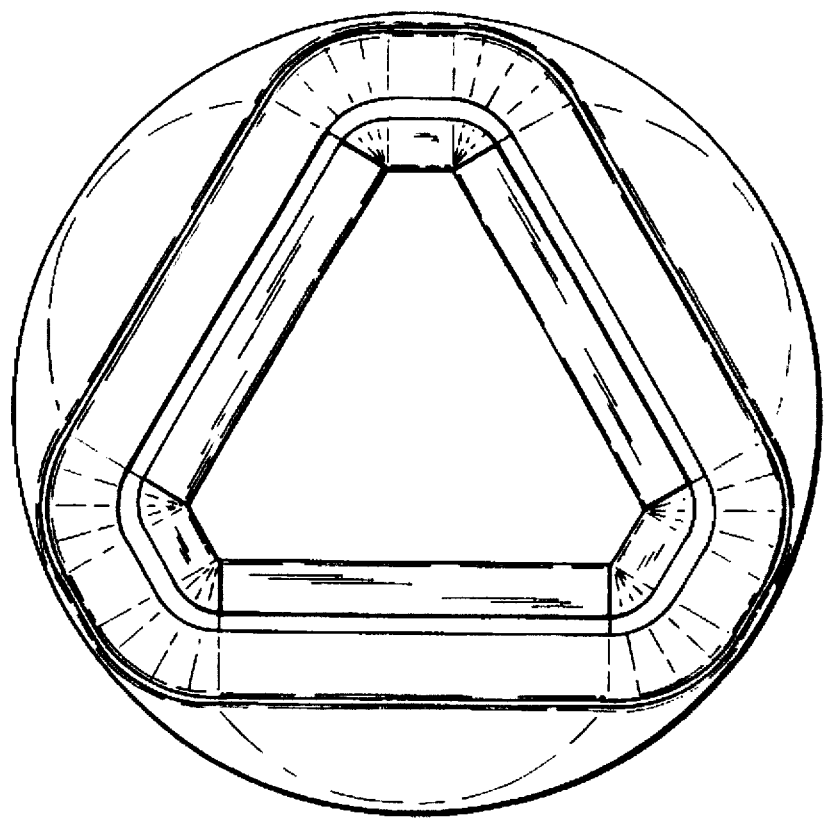
FIG. 6 is a cross sectional view of a triangular configuration exhaust nozzle of a separate embodiment of the present invention.

Depending on the polygonal configuration of the exhaust stream passageway, the vectored core air would conform to one or more flow surfaces of the fixed cowling opposing the pivotable fan manifold where the fan air is injected into the exhaust stream. For example, a separate embodiment of the present invention is shown in FIG. 6, where an exhaust nozzle with a fixed cowling has a triangular exhaust nozzle and passageway. The vectored core air exhaust stream would conform to two opposing flow surfaces when vectored by a first flow surface, or conversely, the vectored core air would conform to one opposing flow surface when vectored by two opposite flow surfaces.

For engine applications where just pitch vectoring or yaw vectoring is required, the exhaust nozzle may have only two flow surfaces. For other engine applications, the exhaust nozzle may have only one flow surface, such as for short take off and landing applications.

Figure 4:
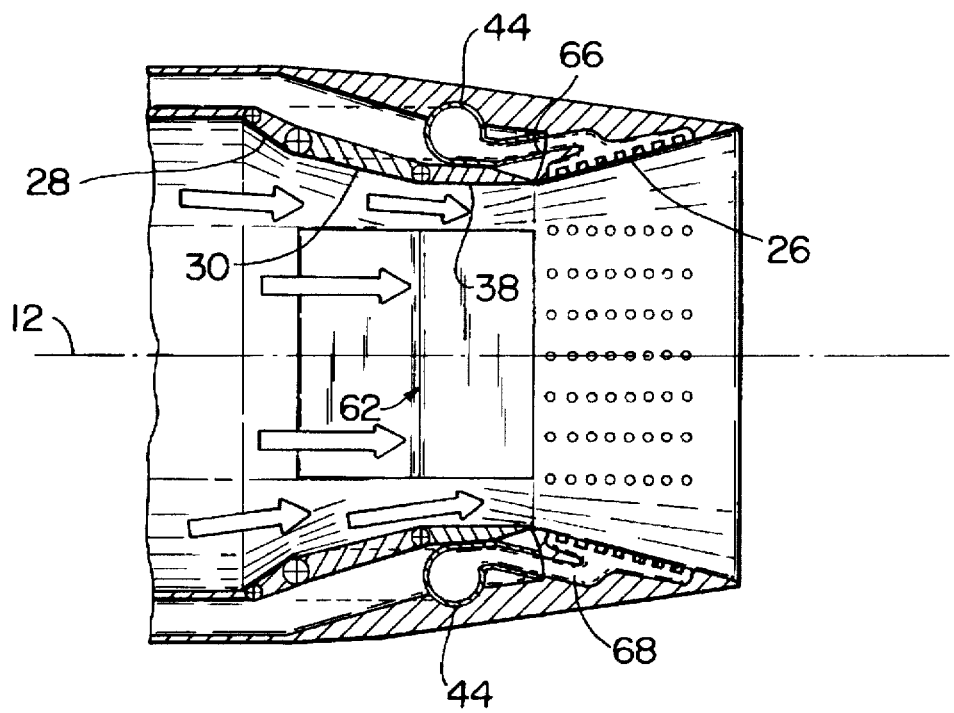
FIG. 4 is a cross sectional view of the exhaust nozzle of the present invention in the maximum augmentation position.

FIG. 4 shows the exhaust nozzle 22 configured to provide cooling air to the cowling divergent walls 26 when the engine operates in maximum afterburner condition. The first and second convergent flaps 28 and 30 are actuated away from the major axis 12 to open up the throat area 62, and the divergent flaps 38 rest against the pivotable fan air manifolds 44 and seal off the ram air 52. The actuation system 64 may then pivot the pivotable fan air manifolds 44 outward from the major axis 12 along a cowling internal lateral wall 66, aligning the fan air manifold 44 with a cowling cooling duct 68. The cowling cooling duct 68 terminates adjacent to the cowling divergent walls 26. The high pressure fan air 56 provides a thermal barrier for the cowling divergent walls 26 from the core air 60 while the engine is in maximum afterburner.

Figure 5:
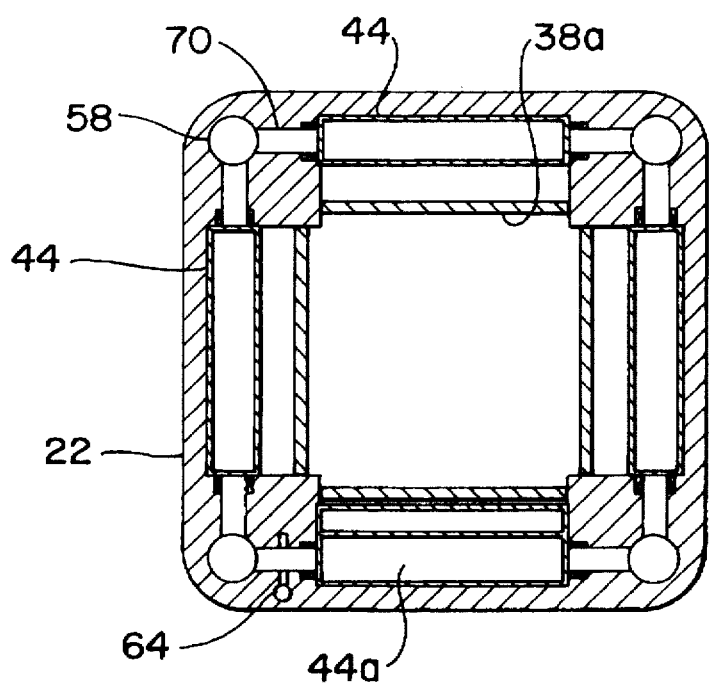
FIG. 5 is a cross sectional view of a rectangular configuration exhaust nozzle of the present invention, aft looking forward.

As shown in FIG. 5, duct to manifold connectors 70 connect the high pressure fan air duct 58 to the pivotable fan air manifolds 44 where the high pressure fan air 56 is available for fluidic vectoring. In this figure, a pivotable fan air manifold 44a is shown in the vectored position. The core air would be deflected against the opposing flow surface, or divergent flap 38a and the cooling divergent wall, not shown in this figure. The typical actuation system 64 is shown connected to the manifold and internal of the exhaust nozzle 22.

Vectoring the core air 60 by use of fluidics allows the exhaust nozzle 22 to control pitch and yaw vectoring, or a combination thereof, for vectoring the aircraft without using external moving components. The exhaust nozzle 22 of the present invention may be integrated with the external skin in of the aircraft providing for a smooth contour of the aircraft and smooth transition between the aircraft and the engine.

No external moving components and a smooth transition between the engine and the aircraft, combined with vectoring by fluidics, provide for a minimum amount of drag while maximizing maneuverability, which are engine characteristics that are highly desirable in fighter aircraft.

Although this invention has been shown and described with respect to a detailed embodiment, those skilled in the art will understand that various changes in form and detail may be made without departing from the spirit and scope of the claimed invention.

What is claimed is:

1. An exhaust nozzle for a gas turbine engine, said engine having an exhaust stream passageway and defining flow streams of core air, high pressure secondary air, and ram air which together define parts of an exhaust stream for flow through the exhaust stream passageway, said exhaust nozzle comprising:

means for selectively injecting one of high pressure secondary air or ram air into said exhaust stream, wherein, in a first position, said high pressure secondary air is injected to vector at least said core air in a direction which is non-parallel to a major axis of the engine, and, in a second position, said ram air is injected into said exhaust stream to flow external of said core air through said exhaust stream passageway, said injecting means being movable between the first and second position.

2. The exhaust nozzle of claim 1, wherein said injecting means comprises a plurality of passageways with at least one passageway configured for injecting ram air and at least one passageway configured for injecting high pressure secondary air into said exhaust stream passageway, wherein, in the first position, said injecting means allows injection of high pressure secondary air but blocks the ram air passageway, and, in a second position, said injecting means allows injection of ram air but blocks the high pressure secondary air passageway.

3. The exhaust nozzle of claim 2, which further comprises a plurality of injecting means positioned around a periphery of the exhaust nozzle, wherein at least one first injecting means injects high pressure air while at least one second injecting means injects ram air.

4. The exhaust nozzle of claim 3, wherein four injection means are provided.

5. The exhaust nozzle of claim 1, which further comprises a convergent portion and a divergent portion, said injecting means being positioned for injection along said divergent portion of the exhaust nozzle.

6. The exhaust nozzle of claim 5, wherein said diverging portion comprises a first diverging portion pivotally associated with said converging portion and a second diverging portion positioned downstream of and adjacent said first diverging portion, said injecting means being positioned for injection between the first and second diverging portions.

7. The exhaust nozzle of claim 6, wherein said first and second diverging portions define flow surfaces and, when said ram air is injected, said ram air flows adjacent said flow surfaces and said core air flows substantially inside said ram air and along the engine major axis.

8. The exhaust nozzle of claim 6, wherein said first and second diverging portions define flow surfaces with the second diverging portion being at a first angle relative to the engine major axis and, when said high pressure secondary air is injected, said high pressure air vectors the core flow at a second angle which is substantially the same as the first angle, away from the engine major axis.

9. The exhaust nozzle of claim 7, wherein the exhaust stream passageway at the second diverging portion is polygonal in shape.

10. The exhaust nozzle of claim 1, wherein the exhaust stream passageway and the exhaust nozzle are substantially rectangular in shape.

11. The exhaust nozzle of claim 1, wherein the high pressure secondary air originates from a fan of the engine.

12. The exhaust nozzle of claim 1, wherein the injecting means is movable to a third position to selectively inject high pressure secondary air into said exhaust stream to flow external of said core air in said exhaust stream passageway for cooling a portion thereof.

13. The exhaust nozzle of claim 12, further comprising a convergent portion and a divergent portion, said divergent portion including an internal passageway having at least one opening to said exhaust stream passageway, wherein, in the third position, high pressure air is injected into said internal passageway and exits through said at least one opening into said exhaust stream passageway.

14. An exhaust nozzle for a gas turbine engine, said engine having an exhaust stream passageway and defining flow streams of at least core air and high pressure secondary air which together define parts of an exhaust stream for flow through the exhaust stream passageway, said exhaust nozzle comprising:

at least one converging portion;

a first diverging portion pivotally associated with said converging portion and defining therebetween an exhaust nozzle throat, said converging and diverging portions being pivotable into the exhaust nozzle throat;

a second diverging portion positioned downstream of said first diverging portion; and means for selectively rejecting one high pressure secondary air or ram air into said exhaust stream, wherein, in a first position, said high pressure secondary air is injected to vector at least aid core air in a direction Which is non-parallel to a major axis of the engine, and in second position, said ram air is injected into said exhaust stream to flow external of said core air through said exhaust stream passageway, said injecting means being movable between the first and second position.

15. A method for vectoring an exhaust stream of a gas turbine engine in an exhaust stream passageway of an exhaust nozzle, which comprises:

injecting high pressure air at a first portion of the periphery of the exhaust nozzle from at least one first manifold, with a velocity vector of the injected high pressure air being non-parallel to a velocity vector of the exhaust stream, as measured at said manifold before the high pressure air is injected;

simultaneously injecting ram air at at least a second portion of the periphery of the exhaust nozzle from at least one second manifold into the exhaust stream passageway, the ram air flowing along and adjacent to at least one wall of the exhaust stream passageway and external of the exhaust stream, and configuring each first and second manifold to be able to selectively inject either high pressure air or ram air into said exhaust stream passageway, wherein said injected ram air at a lower pressure than said pressure air and said exhaust stream.

16. The method of claim 15, which further comprises providing at least three manifolds which substantially surrounds the periphery of the exhaust nozzle and including at least one first manifold and at least two second manifolds.

17. The method of claim 15, which further comprises positioning the first and second manifolds at the same selected longitudinal position within said exhaust nozzle.

18. An exhaust nozzle for a gas turbine engine, the engine having a major axis, at least one ram air duct, at least one high pressure fan air duct terminating at the exhaust nozzle, and an exhaust stream passageway for the flow of an exhaust stream, including fan air, ram air, and core air, through the exhaust nozzle, the exhaust nozzle comprising:

a plurality of convergent flaps arranged to converge the exhaust stream;

a plurality of divergent flaps arranged to diverge the exhaust stream and positioned downstream of the convergent flaps, each divergent flap being pivotally associated with a corresponding convergent flap;

a fixed cowling having divergent cowling walls downstream of the divergent flaps, each of said divergent flaps having a corresponding cowling wall defining a flow surface, wherein the core air flows adjacent to the convergent and divergent flaps and the ram air from the ram air duct enters the exhaust nozzle downstream of the divergent flaps and flows adjacent the fixed cowling;

one pivotable fan air manifold for each flow surface, each pivotable fan air manifold being connected to a high pressure fan air duct, the pivotable fan air manifold being downstream of the ram air duct, wherein the manifold is pivotable between an off, non-vectoring position where the manifold blocks the flow of high pressure fan air into the exhaust stream, and an on, vectoring position, where the manifold is pivoted inwardly from the major engine axis and where the manifold blocks the flow of ram air and injects high pressure fan air where the ram air would otherwise be injected, with the exhaust stream vectoring away from the engine major axis to the opposing flow surface in the on position.

19. The exhaust nozzle of claim 18 wherein the exhaust nozzle and the flow surfaces are polygonal in configuration.

20. The exhaust nozzle of claim 18 wherein the exhaust nozzle and the flow surfaces are generally rectangular in configuration.

21. The exhaust nozzle of claim 18 wherein the fixed cowling further comprises an internal lateral wall and a cowling duct for each flow surface, the cooling duct extending from the internal lateral wall to the cowling divergent walls so that when the pivotable fan air manifolds are pivoted outwardly from the major engine axis to a third position, the fan air manifolds are aligned with the cowling cooling duct and high pressure fan air is deliverable through the manifolds to the cowling divergent wall as cooling air.

22. An exhaust nozzle for a gas turbine engine, said engine having a major axis, at least one ram air duct for flowing ram air, and at least one high pressure fan air duct for flowing fan air and terminating at the exhaust nozzle, the engine having an exhaust stream, which includes at least one of core air, fan air, and ram air, through the exhaust nozzle, the exhaust nozzle comprising:

at least one convergent flap arranged to converge the flow of core air;

a corresponding number of divergent flaps, the divergent flaps being located downstream of the convergent flaps and each divergent flap being pivotally connected to a corresponding convergent flap;

a fixed cowling having a corresponding number of divergent walls downstream of the divergent flaps, each said divergent flap and each corresponding cowling wall defining a flow surface, the core air flowing adjacent to the convergent and divergent flaps and the ram air flowing downstream of the divergent flaps and adjacent to the fixed cowling;

a plurality of pivotable fan air manifolds connected to the high pressure fan air duct, the pivotable fan air manifolds being located at a downstream end of the ram air duct, so that when the manifolds are in an off position, the engine is in non-vectoring operation and the manifolds block the flow of high pressure fan air into the exhaust stream, the fan air having a higher pressure than the ram air and, in an on position, when the pivotable fan air manifolds pivot inward from the major engine axis, the manifolds block the flow of ram air and inject high pressure fan air where the ram air would otherwise be injected into the exhaust stream, with the core air vectoring away from the engine major axis and toward the opposing flow surface.

23. The exhaust nozzle of claim 22 wherein one pivotable fan air manifold is provided for each flow surface.

24. The exhaust nozzle of claim 22 wherein the fixed cowling further comprises an internal lateral wall and a cowling cooling duct for each flow surface, the cooling duct extending from the lateral wall to the cowling internal divergent walls so that when the pivotable fan air manifolds are pivoted outward from the major engine axis, the fan air manifolds are aligned with the cowling cooling duct and high pressure fan air is delivered to the cowling internal divergent walls as cooling air.

* * * * *